US012575011B2

(12) United States Patent
Ormsbee et al.

(10) Patent No.: US 12,575,011 B2
(45) Date of Patent: Mar. 10, 2026

(54) SYSTEMS AND METHODS FOR OPTIMIZED SINGLE BUTTON CONTROL OF A LIGHTING MODULE INCLUDING PRESET MEMORY AND HOLD CONTROL

(71) Applicant: Nite Ize, Inc., Boulder, CO (US)

(72) Inventors: Bowden Ormsbee, Longmont, CO (US); Steven L. Lindquist, Broomfield, CO (US); Leo Lesperance, Lafayette, CO (US)

(73) Assignee: Nite Ize, Inc., Boulder, CO (US)

( * ) Notice: Subject to any disclaimer, the term of this patent is extended or adjusted under 35 U.S.C. 154(b) by 80 days.

(21) Appl. No.: 18/586,883

(22) Filed: Feb. 26, 2024

(65) Prior Publication Data

US 2024/0196500 A1 Jun. 13, 2024

Related U.S. Application Data

(63) Continuation-in-part of application No. 29/876,942, filed on May 31, 2023, and a continuation-in-part of application No. 17/217,378, filed on Mar. 30, 2021, now Pat. No. 11,924,936.

(51) Int. Cl.

| | |
|---|---|
| ***H05B 47/17*** | (2020.01) |
| ***H05B 45/10*** | (2020.01) |
| ***H05B 45/20*** | (2020.01) |
| ***H05B 47/16*** | (2020.01) |
| ***H05B 47/165*** | (2020.01) |

(52) U.S. Cl.

CPC ............ *H05B 47/17* (2020.01); *H05B 45/10* (2020.01); *H05B 45/20* (2020.01); *H05B 47/16* (2020.01); *H05B 47/165* (2020.01)

(58) Field of Classification Search

None

See application file for complete search history.

(56) References Cited

U.S. PATENT DOCUMENTS

| | | | |
|---|---|---|---|
| 6,942,357 | B2 | 9/2005 | Parsons et al. |
| 7,683,275 | B2 | 3/2010 | Moore et al. |
| 7,726,852 | B2 | 6/2010 | Sanoner et al. |
| 8,534,885 | B2 | 9/2013 | Moore et al. |

(Continued)

OTHER PUBLICATIONS

International Search Report and Written Opinion dated Jun. 16, 2022 from related PCT Application No. PCT/US2022/071410. 8 pages.

*Primary Examiner* — Crystal L Hammond

(74) *Attorney, Agent, or Firm* — FisherBroyles, LLP; Craig W. Mueller

(57) ABSTRACT

A method for selecting a mode/color on a lighting module, the lighting module having only a single button includes: receiving a first actuation of the single button at the lighting module. The method further includes responsive to the first actuation, turning the device on and displaying a first mode/color. The method further includes detecting that the single button is held down. The method further includes displaying a plurality of modes/colors in a timed sequence, such that each mode/color of the plurality of modes/colors is displayed for a preset time period. The method further includes detecting that the single button is released. The method further includes displaying a selected mode/color of the plurality of modes/colors that was displayed when the single button was released.

18 Claims, 8 Drawing Sheets

(56) References Cited

U.S. PATENT DOCUMENTS

| | | | | |
|---|---|---|---|---|
| 8,550,653 | B2 | 10/2013 | Wilson et al. | |
| 8,806,723 | B2 | 8/2014 | Martinson et al. | |
| 10,215,383 | B2 | 2/2019 | Grider et al. | |
| 11,924,936 | B2 | 3/2024 | Ormsbee et al. | |
| 2002/0047646 | A1 | 4/2002 | Lys et al. | |
| 2003/0214259 | A9 | 11/2003 | Dowling et al. | |
| 2004/0201983 | A1 | 10/2004 | Yu | |
| 2006/0176685 | A1 | 8/2006 | Galli et al. | |
| 2007/0293125 | A1 | 12/2007 | Jenkins et al. | |
| 2014/0203710 | A1 | 7/2014 | Chuan | |
| 2014/0265906 | A1 | 9/2014 | Lim et al. | |
| 2017/0034896 | A1* | 2/2017 | Minsky | H05B 47/10 |
| 2017/0041999 | A1* | 2/2017 | Moore | H05B 47/16 |
| 2017/0184260 | A1 | 6/2017 | Munoz | |
| 2017/0245336 | A1* | 8/2017 | Li | H05B 47/16 |
| 2017/0276303 | A1 | 9/2017 | Chen | |
| 2020/0032969 | A1* | 1/2020 | Chen | F21V 23/0428 |
| 2020/0124241 | A1 | 4/2020 | Inskeep | |

* cited by examiner

SYSTEMS AND METHODS FOR OPTIMIZED SINGLE BUTTON CONTROL OF A LIGHTING MODULE INCLUDING PRESET MEMORY AND HOLD CONTROL

This application is a continuation-in-part of U.S. patent application Ser. No. 17/217,378, filed Mar. 30, 2021, now U.S. Pat. No. 11,924,936, issued Mar. 5, 2024, the entire disclosure of which is incorporated by reference herein.

This application is also a continuation-in-part of U.S. patent application Ser. No. 29/876,942, filed May 31, 2023, the entire disclosure of which is incorporated by reference herein.

FIELD OF THE INVENTION

Embodiments of the present invention are generally directed to compact light sources configured to emit various types and modes of light.

BACKGROUND OF THE INVENTION

In various scenarios, lighting devices for consumers are created with an emphasis on simplicity and durability. In some scenarios, such lighting devices may include a single control button. Even though such devices only include a single button, it may be desirable to have multiple functional modes, including modes that produce multiple colors and/or flashing sequences.

The compact size and high-intensity lighting capability of light-emitting diodes (LEDs) make manufacturing small lighting devices possible. In many scenarios, these devices usually include a single switch, allowing for size reduction and increased ease of fabrication. Additionally, lighting modules with single button control can be implemented in a wide variety of devices, including but not limited to balls, light sticks, glowsticks, flying discs, headbands, bicycle lights, goal markers, fan appreciation paraphernalia, safety lights, etc.

SUMMARY OF THE INVENTION

It is an aspect of some embodiments of the present invention to provide a method for selecting a mode/color on a lighting module; the lighting module having only a single button that includes receiving a first actuation of the single button at the lighting module. The method further including, responsive to the first actuation, turning the device on and displaying a first mode/color. The method further includes detecting that the single button is held down. The method further includes displaying a plurality of modes/colors in a timed sequence, such that each mode/color of the plurality of modes/colors is displayed for a preset time period. The method further includes detecting that the single button is released. The method further includes displaying a selected mode/color of the plurality of modes/colors that was displayed when the single button was released. In one alternative, the method further includes receiving a second actuation of the single button at the lighting module and responsive to the second actuation, changing the selected mode/color to flashing. In another alternative, the changing the selected mode/color only occurs if a flashing preset time period has not passed. Alternatively, if the flashing preset time period has passed, the second actuation causes the lighting module to shut off. In another alternative, one of the plurality of modes/colors is a disco mode. Alternatively, the disco mode is a mode characterized by displaying a series of light colors, each for a short time period, and repeating such displaying. In another alternative, the changing the selected mode/color to flashing does not occur if the selected mode/color is disco mode. Alternatively, the selected mode/color is remembered when the lighting module is shut off, such that upon turning the device on again, the mode/color present at shut off is activated. In another alternative, the method further includes receiving a third actuation of the single button; and responsive to the third actuation, deactivating the lighting module. Alternatively, the method further includes receiving a second actuation of the single button; detecting that a disco mode of the plurality of modes/colors is active; and responsive to the second actuation, deactivating the lighting module.

It is another aspect of some embodiments of the present invention to provide a lighting module includes a light source; a microprocessor; and a button. The microprocessor is configured to execute stored instructions to receive a first actuation of the single button at the lighting module. The microprocessor is further configured to execute stored instructions to responsive to the first actuation, turn the light source on and displaying a first mode/color. The microprocessor is further configured to execute stored instructions to detect that the single button is held down. The microprocessor is further configured to execute stored instructions to display a plurality of modes/colors in a timed sequence, such that each mode/color of the plurality of modes/colors is displayed for a preset time period. The microprocessor is further configured to execute stored instructions to detect that the single button is released. The microprocessor is further configured to execute stored instructions to display a selected mode/color of the plurality of modes/colors that was displayed when the single button was released. In one alternative, the microprocessor is further configured to execute stored instructions to receive a second actuation of the single button at the lighting module and responsive to the second actuation, change the selected mode/color to flashing. Alternatively, the changing the selected mode/color only occurs if a flashing preset time period has not passed. In another alternative, if the flashing preset time period has passed, the second actuation causes the lighting module to shut off. Alternatively, one of the plurality of modes/colors is a disco mode. In another alternative, the disco mode is a mode characterized by displaying a series of light colors, each for a short time period, and repeating such displaying. Alternatively, the change of the selected mode/color to flashing does not occur if the selected mode/color is disco mode. In another alternative, the selected mode/color is remembered when the lighting module is shut off, such that upon turning the device back on, the selected mode/color present at shut off is activated. Alternatively, the microprocessor is further configured to execute stored instructions to receive a third actuation of the single button and responsive to the third actuation, deactivate the lighting module. In another alternative, the microprocessor is further configured to execute stored instructions to receive a second actuation of the single button, detect that a disco mode of the plurality of modes/colors is active, and responsive to the second actuation, deactivate the lighting module.

It is still yet another aspect of some embodiments of the present invention to provide a housing configured to receive and accommodate the lighting module. The housing of one embodiment of the present invention is configured to cooperate with at least one strap, for example, to allow the lighting device to be selectively interconnected to another object. For example, in one embodiment, the housing has an arcuate bottom surface configured to engage with a corresponding object having a curved outer surface, such as a portion of a bicycle frame, ski pole, hiking pole, etc. In other embodiments, the housing includes appendages configured to accept a strap, such as a backpack strap, helmet strap, ski goggle strap, leash, etc., thereby affixing the lighting device to the strap.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

8 is a front perspective view of a lighting device of another embodiment of the present invention.

Figure 8:
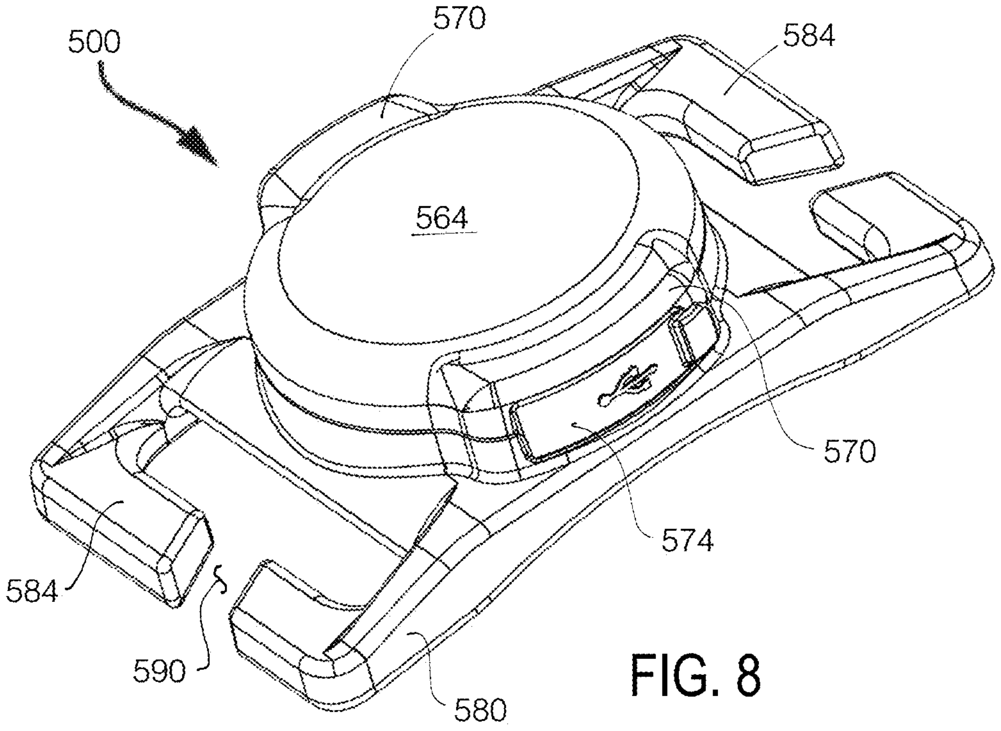
Figure 9:
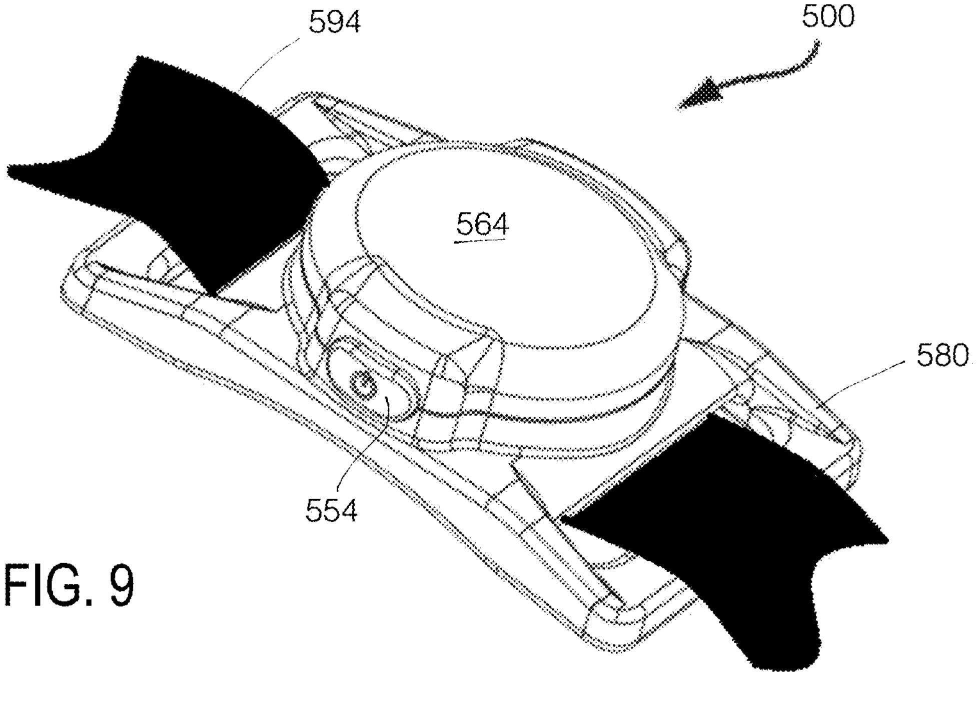

FIG. 9 is a rear perspective view of the lighting device shown in FIG. 8.

Figure 10:
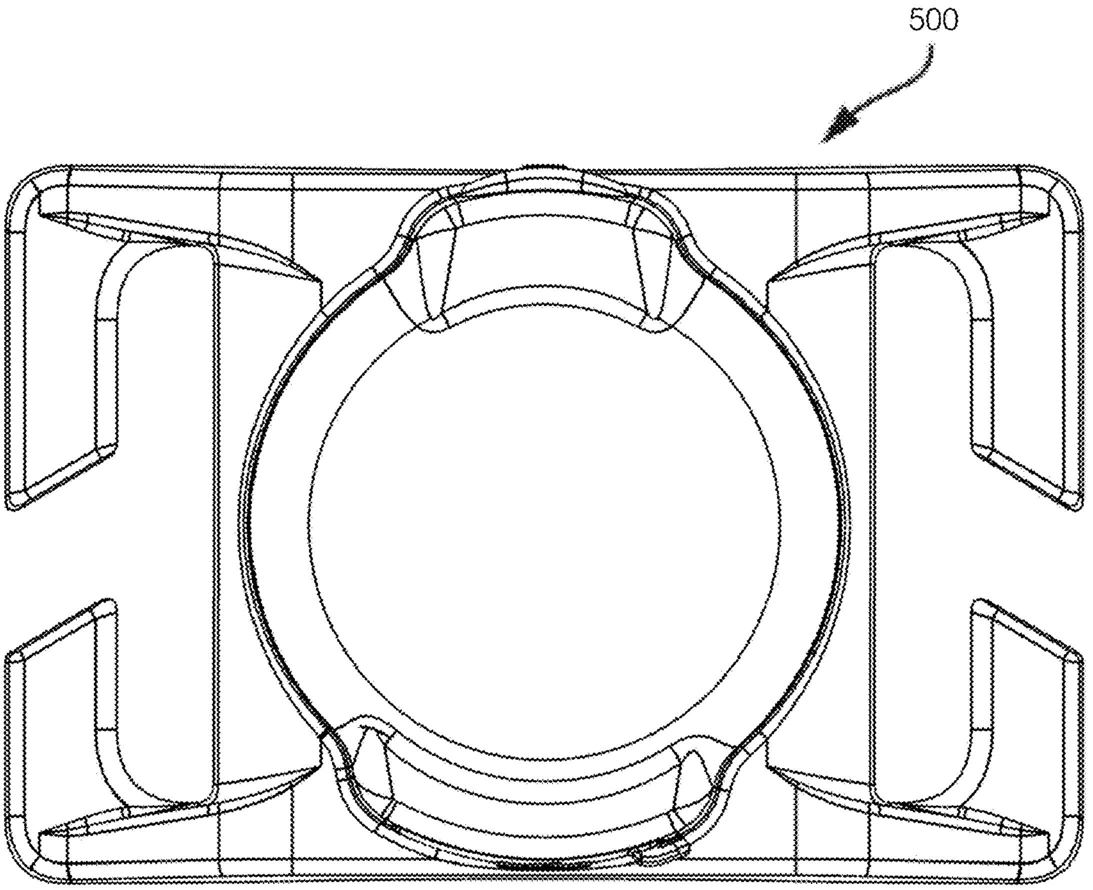

FIG. 10 is a top plan view of the lighting device shown in FIG. 8.

Figure 11:
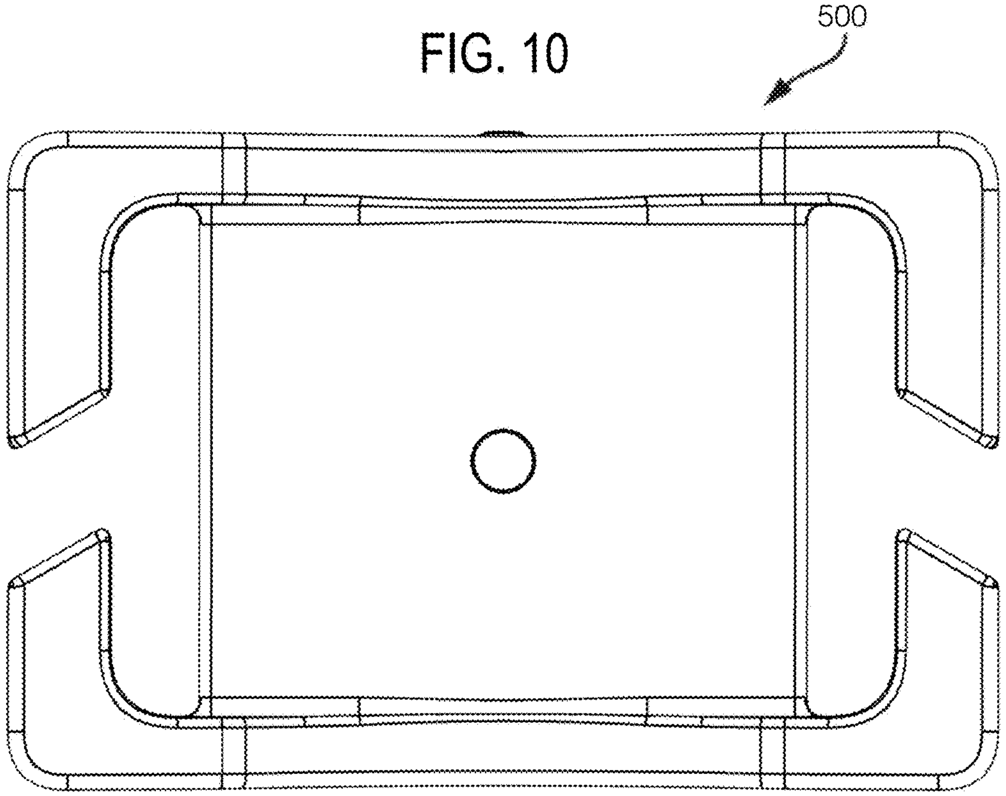

FIG. 11 is a bottom plan view of the lighting device shown in FIG. 8.

Figure 12:
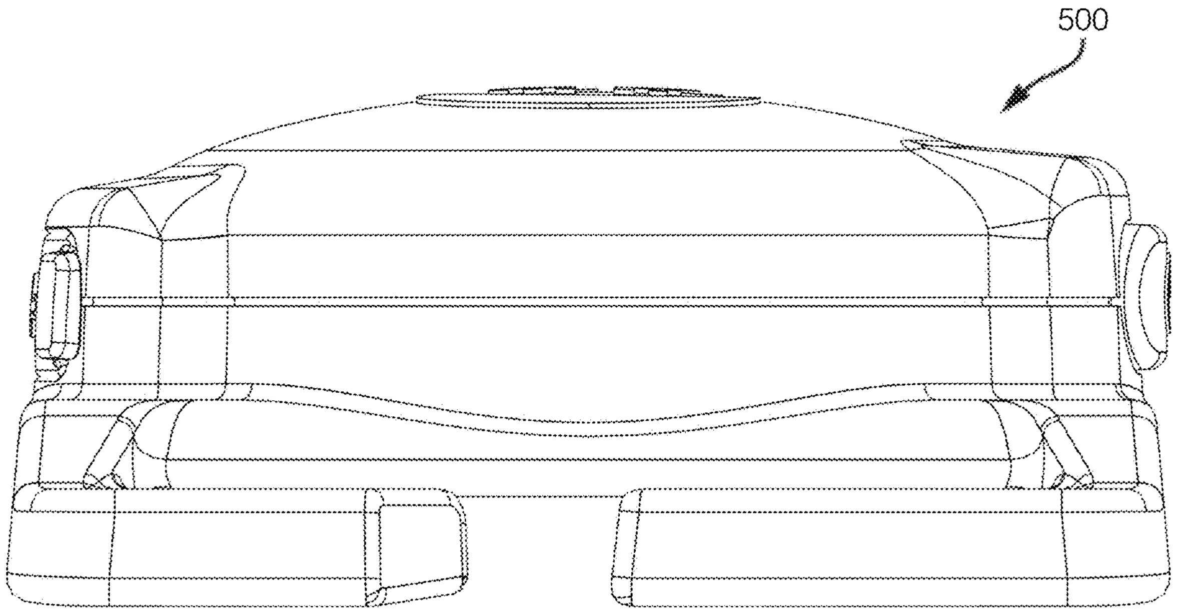

FIG. 12 is a right elevation view of the lighting device shown in FIG. 8.

Figure 13:
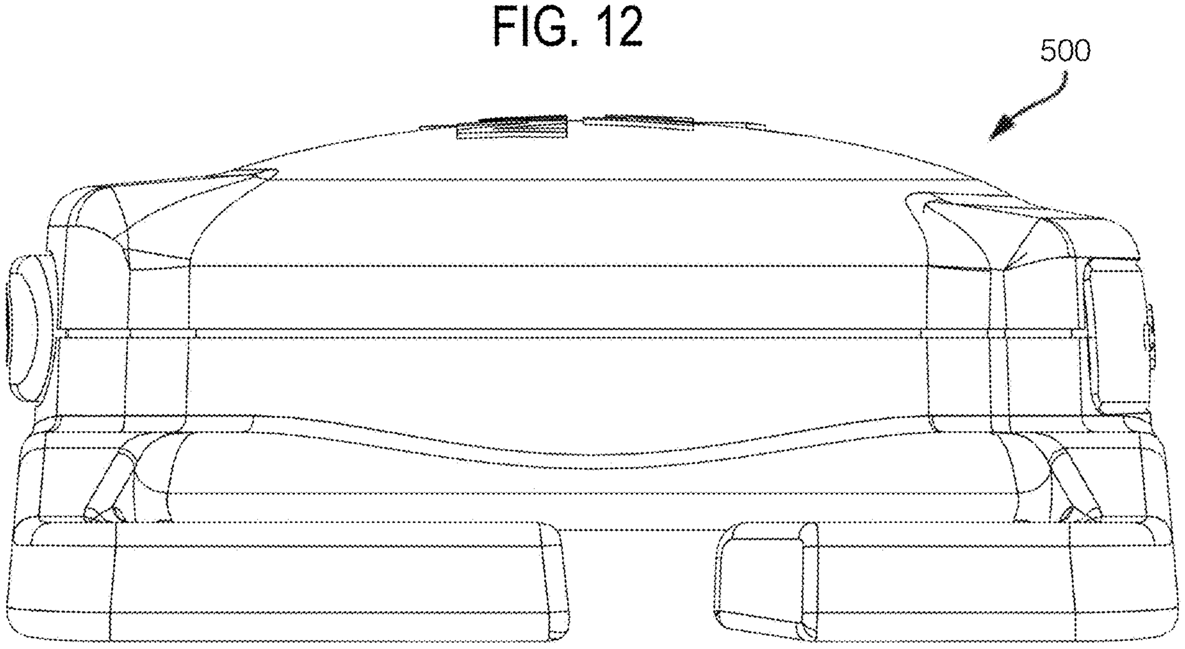

FIG. 13 is a left elevation view of the lighting device shown in FIG. 8.

Figure 14:
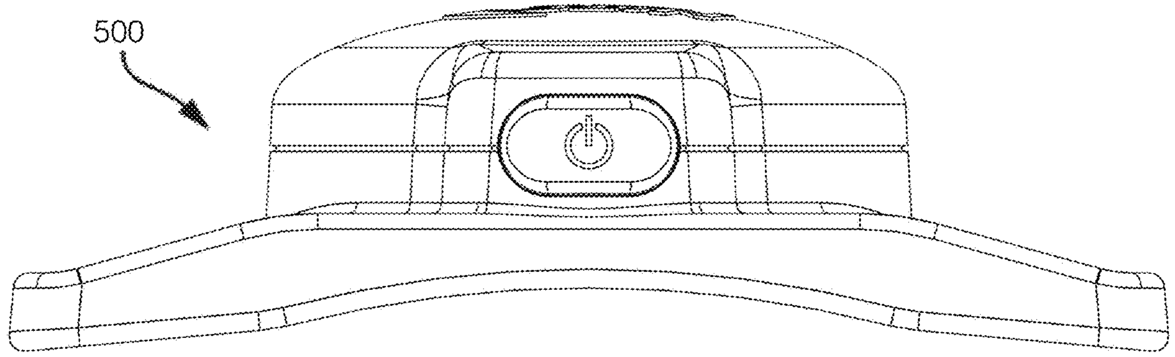

FIG. 14 is a rear elevation view of the lighting device shown in FIG. 8.

Figure 15:
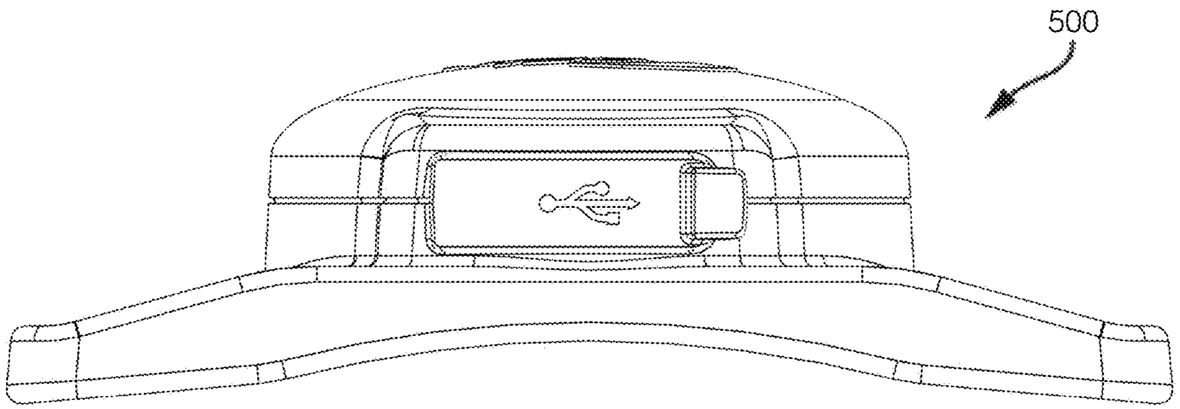

FIG. 15 is a front elevation view of the lighting device shown in FIG. 8.

DETAILED DESCRIPTION

Certain terminology is used herein for convenience only and is not to be taken as a limitation on the embodiments of the systems and methods for optimized single button control of a lighting module, including preset memory and hold control (preset single button algorithm/system). The method/microprocessor-based control system may be implemented in a lighting module in many embodiments. The lighting module in many embodiments is designed to fit in a wide variety of receivers located in the lighting device. Embodiments of the lighting device may take on various forms, including the ones shown in the present application. In many configurations, the designs herein provide for a modular system, where the lighting module may fit in a wide variety of devices (lighting devices). In many embodiments, the preset single button algorithm/system provides for a cyclical selection system of color and a single push actuation of on/flash/off. Additionally, in many embodiments, the device remembers the color selection of the device. In many embodiments, such a system provides for efficient single button control that minimizes the selection time and wear on the single button. In many embodiments, it capitalizes on the likelihood that the user will desire to select the same color ordinarily for the lighting device.

Figure 1:
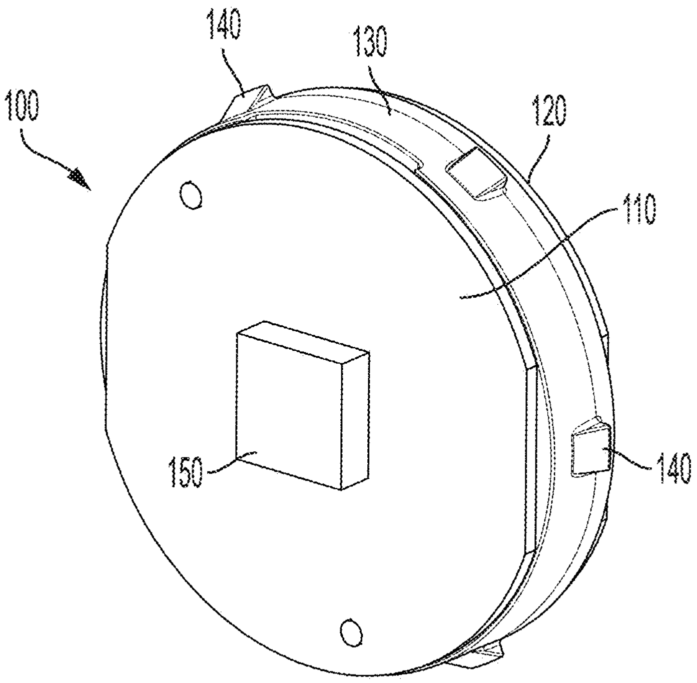
FIG. 1 shows one embodiment of a lighting module.

To add context to the how the single button algorithm operates within a single button lighting device, an exemplary lighting module is provided that may be deployed in a variety of lighting devices, such as balls, light-sticks, glow-sticks, flying discs, headbands, bicycle lights, goal markers, fan appreciation paraphernalia, etc. FIG. 1 shows one embodiment of a lighting module 100. Lighting module 100 generally includes two printed circuit boards (PCB) used for circuitry and to support and enclose the lighting module 100. Lighting module 100 includes PCB 110 and PCB 120. A plastic ring 130 is placed between PCB 110 and PCB 120 to complete the lighting module 100 enclosure. Plastic ring 130 includes protrusions 140, providing a fiction or snap snap-fit way of holding the lighting module 100 in a lighting device. This will be described in more detail below. In contrast to many lighting modules, the PCBs form a portion of the module, which saves fabrication costs. Additionally, visible in FIG. 1 is LED 150. This LED in many configurations provides for the vertical projection of light, that is perpendicular to the largest outward facing face. In many embodiments, the PCB 110 may also include exposed microprocessors, capacitors, and or other circuitry. This is not shown in the embodiment of the lighting device in FIG. 1.

Figure 2:
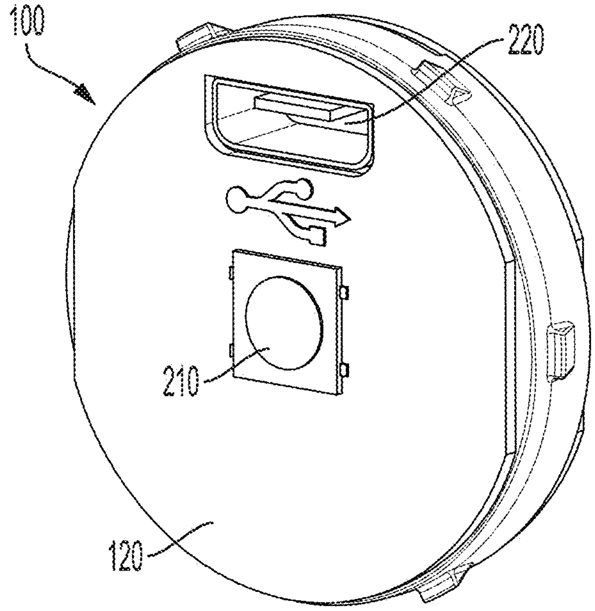
FIG. 2 shows a reverse view of the lighting module of FIG. 1.

FIG. 2 shows another view of the lighting module 100. In this view, push button switch 210 (momentary) is shown. Additionally, charging port 220 is shown. In many embodiments, charging port 220 may be a micro USB port. In alternatives, other charging ports are possible, depending on the total size of the lighting device, including USB ports. As with the view of FIG. 1, PCB 220 may include exposed circuitry or interconnections.

Figure 3:
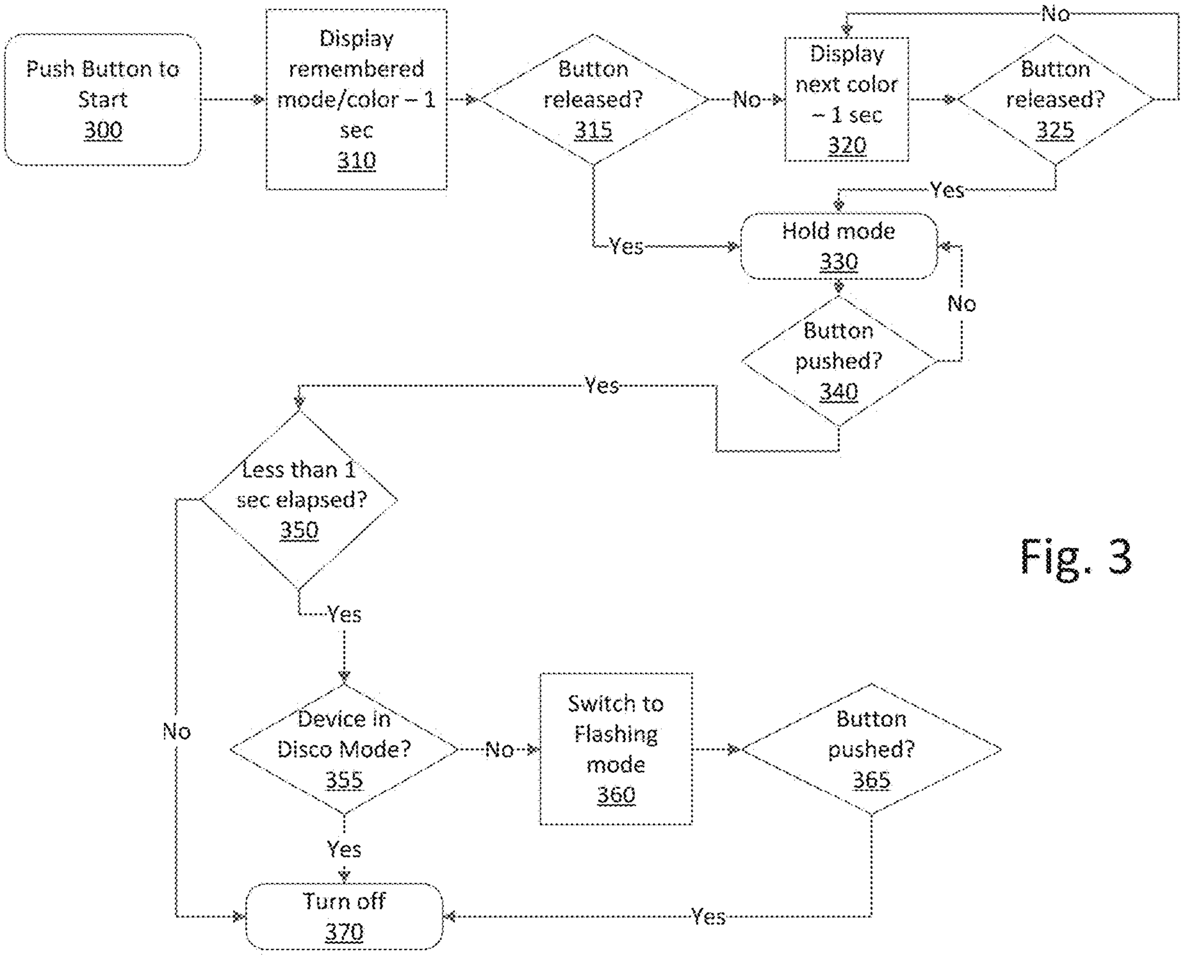
FIG. 3 shows a flowchart for single button operation of the lighting module.
Figure 4:
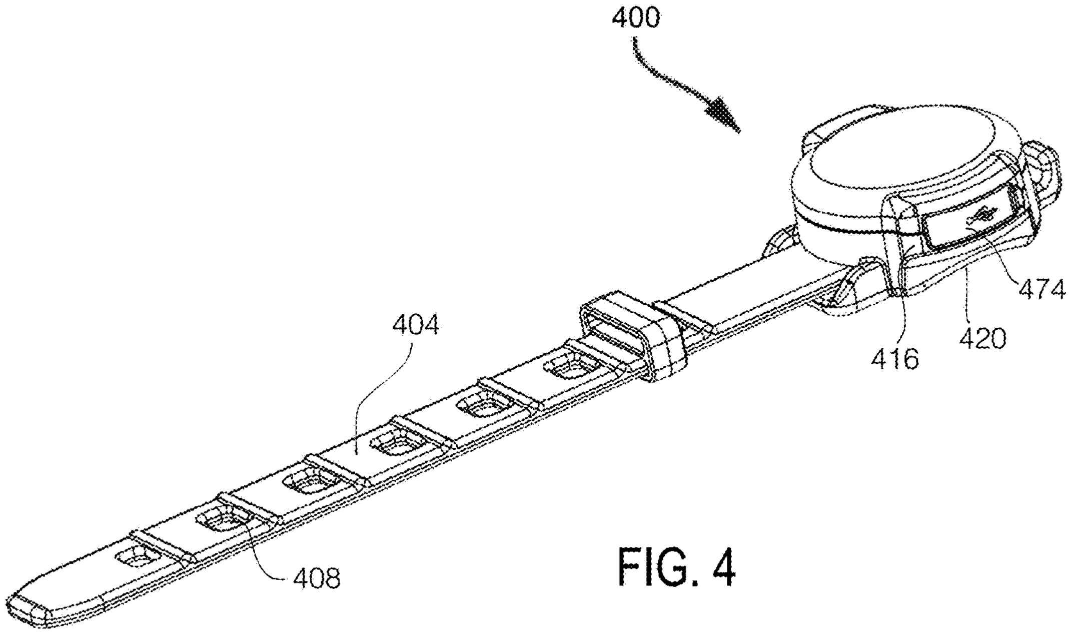
FIG. 4 is a front perspective view of a lighting device and associated strap of one embodiment of the present invention.
Figure 5:
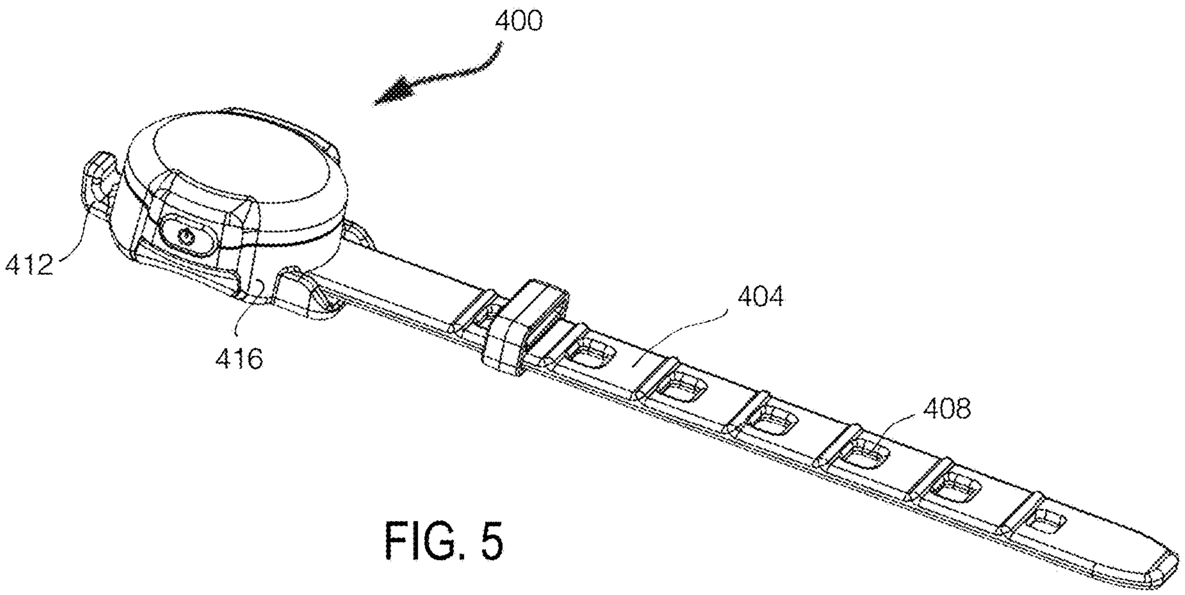
FIG. 5 is a rear perspective view of the lighting device and associated strap.
Figure 6:
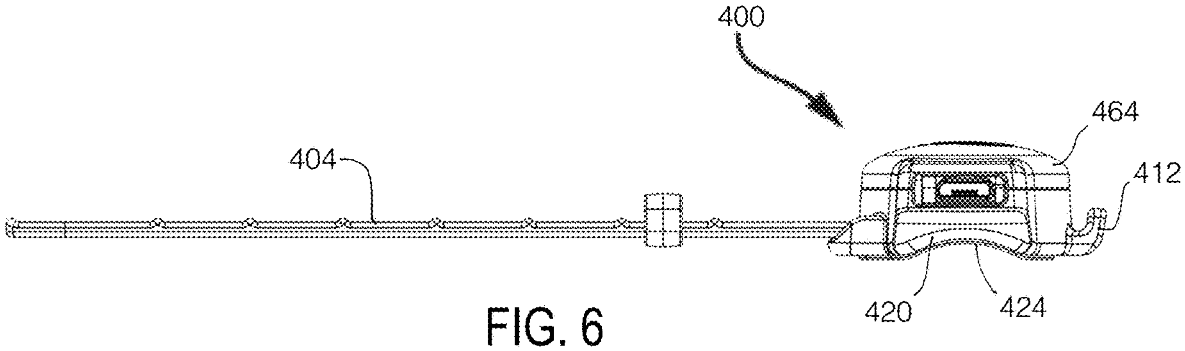
FIG. 6 is a front elevation view of the lighting device and associated strap.
Figure 7:
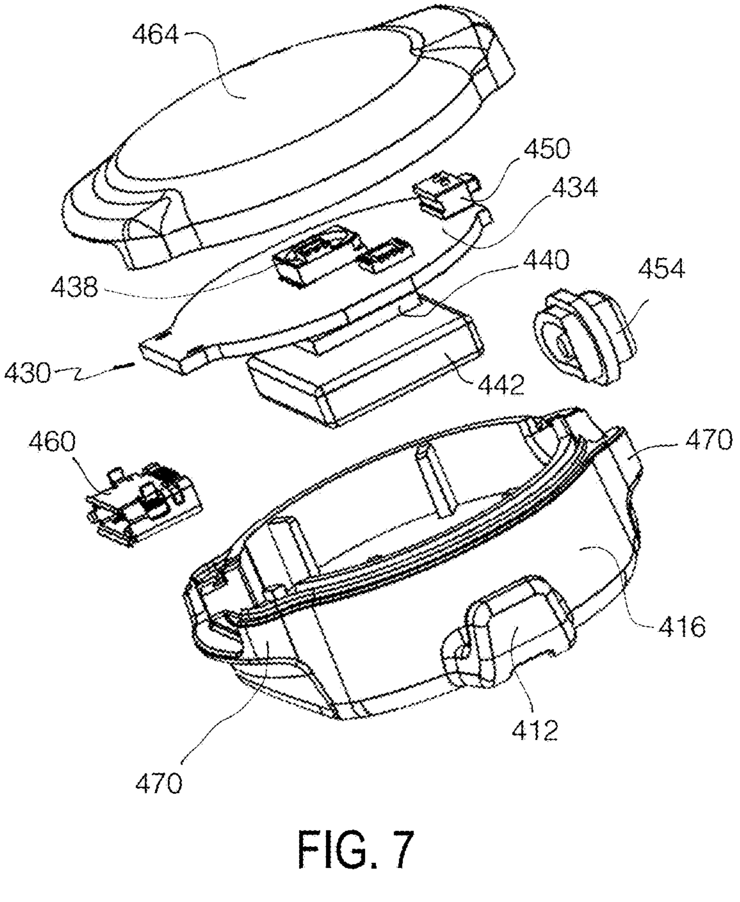
FIG. 7 is an exploded perspective view of the lighting device of one embodiment of the present invention.

Therefore, an exemplary lighting module is provided that may work with the single preset single button algorithm/system. FIG. 3 describes one embodiment of a preset single button algorithm/system. In this embodiment, generally, the user continuously depresses the button to cycle through the available colors emitted by a lighting device, wherein another actuation of the button switches the lighting device to a flashing mode. Actuation of the button again will shut off the lighting device. Additionally, a "disco mode" may be selected in certain embodiments, which directs the LED to provide a constant color change—cyan, to red, to yellow, to green, to blue. In one embodiment, disco mode comprises holding a color for a predetermined amount of time, e.g., one second, and then switching to another color for the predetermined amount of time. The contemplated one second time interval is purely exemplary, and other time periods may be set and fall into the scope of the invention. Periods in the range 0.5-5 seconds are believed to be pleasing for the disco mode, however, other periods are possible.

In step 300 the user pushes the single button to activate the device. The device has a memory, and in step 310, it automatically begins displaying a saved mode. The saved mode is either a continuous light of a single color or what is referred to as a disco mode. If the button is released, the device advances to step 330, and whatever mode the device is currently in is held. The device begins to cycle through modes in step 320 is instead continuously depressed. The device displays the next color/mode in the sequence for a predetermined amount of time. In many alternatives, this may be between at least about 0.5-1.0 seconds. If the button is not released in step 325, the device displays the next color/mode again in step 320. This process continues and is repeated until a button release. Again, the predetermined time interval associated with cycling through the colors/modes is purely exemplary, and other time periods may be set and fall into the scope of the invention. Periods in the range 0.5-5 seconds are believed to be pleasing for selecting a color/mode, however, other periods are possible. The designation of color/mode is selectively modified because the cycle provided by the microprocessor of some embodiments of the present invention, i.e., the controller, may only change colors/modes. Other embodiments of the present invention employ microprocessors that allow for color intensity, flash rates, and other modes. The color and mode selection may be combined. If the button is released in step 325 then the device proceeds to step 330 and holds whatever color/mode present when the the button is released. In many embodiments, one of the colors is designated as the disco mode and, if the button is released during the disco mode, then it will be selected. Alternatively, a mode can be set to rapid flashing that denotes disco mode or another visual indicator.

In step 330, when the button has been released and the mode selected, the device monitors for an additional push of the button in step 340. If the button is not pushed, the device remains on, and if the button is pushed, the device proceeds to step 350. Step 350 determines whether less than one second has elapsed since the initial button press was released. In many embodiments, the one second may be 3 seconds, but of course, there are numerous possibilities. If not, the device interprets the push of a button as a shut off request, and the algorithm proceeds to step 370, where the lighting device turns off. If the button is pushed within one second (or other predetermined time interval), the lighting device will transition to flashing mode. In such a case, the flow proceeds to step 355, where it is determined whether the current mode is disco mode. Disco mode does not have a flashing version in some embodiments. Thus, if the lighting device is in disco mode when the button is depressed at this stage, the flow proceeds to step 370, where the lighting device is turned off. If the lighting device is not in disco mode, a switch to flashing mode occurs at step 360. Pressing the button again in step 365 causes the flow to proceed to step 370 where the lighting device turns off. Of course, the one second time is purely exemplary, and other time periods may be set and fall into the scope of the invention. Periods in the range 0.5-5 seconds are believed to be pleasing for the time limit to select flashing mode, however, other periods are possible. Additionally, flashing mode may be possible in some versions of disco mode, so step 355 may be omitted. In such a scenario, the colors may flash, but change more slowly, such that a color is held for 5 seconds while flashing before transitioning to the next color.

Ultimately, the point of the algorithm is to have a system for the selection of a first mode/color and then provide for a modification to the display of the first mode/color, all using a single button. In other words, the button is held in the first part of the selection and then released when the desired color/mode is displayed. The desired color/mode may then be modified by pressing the button again within a short time period (resulting in flashing in the example).

In some embodiments, if after selecting a mode, the button is held down, the flow will proceed from step 330 to step 310, essentially restarting the color/mode selection procedure. Stated differently, in this configuration, any time the button is held, the system will proceed to the mode selection mode until the button is released. This can occur even when the device is in flashing mode 360. Alternatives to the modes and algorithm are possible, especially in the case of timing. In many embodiments, the system provides for a button hold mode, which may be activated at any time by holding the button and releasing it when the desired mode is displayed. Additionally, the system provides for a time-limited mode modification by actuating (and releasing) the button within a time period of selection of the mode via the button hold.

In some embodiments, when the lighting device is reactivated after shut off, the first mode displayed will be the last mode that was active (modified or unmodified by the flashing selection). By way of example, if, in a first action, the button is held to select the color green, and then the button is actuated quickly to activate the flashing mode before the lighting device is shut off, the default will be a flashing green color when the lighting device is reactivated. In some alternatives, the device could be programmed to activate in the steady mode at reactivation, regardless of whether the mode at shut off was steady or flashing green. In some embodiments, the initial lighting mode at reactivation will depend on how long the lighting device was shut off, wherein a quick reactivation will revert to a steady light mode, and reactivation after a predetermined time will direct the microprocessor to mimic the color and mode characteristics (e.g., flashing, pulsing, etc.) of the lighting device at shut off.

Embodiments of the method deployed in the lighting module may occur primarily in the microprocessor. The microprocessor may include software in various embodiments. Various embodiments of the systems and methods controlling the lighting module may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form, such as, but not limited, to, source code, compiled code, interpreted code, executable code, static code, dynamic code, and the like. Such a computer-readable medium may include any tangible non-transitory medium for storing information in a form readable by one or more computers, such as, but not limited to, read only memory (ROM), random access memory (RAM), magnetic disk storage media; optical storage media; a flash memory, etc. those of ordinary skill in the art will appreciate that the microprocessor may be configured to communicate with a user's mobile device, or similar device, wherein the functionality of the light module and, by extension, the lighting device may be selectively programmed and altered. In some embodiments, the degree of control is enhanced, wherein activation of the lighting device is timed, e.g., the lighting device will turn on and shut off as directed. In other embodiments, the lighting module includes a location sensing device (or cooperates with a location sensing device, e.g., a GPS device, a NFC device, a Bluetooth communication device that cooperates with the mobile device, etc.), wherein light activation is triggered when the light module exits and/or enters a predetermined boundary. This aspect of some embodiments of the present invention is very useful to identify individuals (e.g., children or Alzheimer's patients) or pets that have left a predefined boundary. Further, another enhanced safety feature could be employed wherein the lighting device emits a message in Morse Code if outside a predefined boundary, away from a vehicle or watercraft, is wet, is damaged, has not returned to a predefined location within a given time.

FIGS. 4-7 show a lighting device 400 of another embodiment of the present invention that may be associated with a strap 404. The strap 404 of one embodiment of the present invention is selectively deformable with a plurality of apertures 408 configured to engage with a hook 412 extending from the lighting device's housing 416. In operation, a lower surface 420 of the housing 416 engages an object, e.g., a portion of a bike frame (not shown), wherein the strap 404 is wrapped about the object and interconnected to the hook 412, thereby securing the lighting device 400 to the object. In one embodiment, the strap is made of a rubberized material, wherein a portion thereof, i.e., a strap head 424, engages the lower surface 420 of the lighting device, which helps maintain the position of the lighting device when it is interconnected to the object by way of frictional engagement. In some embodiments, the lower surface 420 and/or strap head 424 are arcuate, thereby enhancing lighting device engagement to cylindrical or semi-cylindrical objects.

The housing 416 has an interior volume that receives and secures a lighting module 430. The lighting module 430 shown in FIG. 7 may be similar to that described above with respect to FIGS. 1 and 2. In this embodiment, however, the lighting module 430 is generally comprised of a printed circuit board 434 that possesses an integrated circuit. The printed circuit board supports a light 438, e.g., at least one LED, and a controller 440, which possesses at least one microprocessor. A chargeable battery 442 is used to power the integrated circuit and the light. The light is selectively activated and deactivated by a switch 450, which may be interconnected to a pushbutton 454. A charge port 460 is also shown, which may be of the configuration described above. A cap 464 is selectively interconnected or bonded to the housing 416. In one embodiment of the present invention, the housing includes bosses 470 that accommodates portions of the charge port 460 and the pushbutton 454. The pushbutton 454 is situated within its boss 470 and provides an efficient way to actuate the switch 450 from outside the housing 416. The pushbutton switch 454 also helps prevent fluid ingress into the housing. Likewise, a door 474 is provided to keep fluid and debris from entering the charge port 460.

FIGS. 8-15 show the lighting device 500 of another embodiment of the present invention that has a housing 516 that is slightly different than the one shown with respect to FIGS. 4-7. Here, the housing accommodates the lighting module shown in FIG. 7, for example, and selectively receives a cap 564. The housing and cap also define bosses 570, associated with a door 574 and a pushbutton 554. The primary difference of this embodiment is the presence of appendages 580 that terminate in inwardly-extending fingers 584 that define a gap 590. The gap 590 allows for the lighting device 500 to be received onto a strap 594.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A method for selecting a mode/color emitted by a lighting device of a lighting module having only one mode/color button, comprising:

- initiating a first actuation of the mode/color button by depressing the mode/color button and releasing the mode/color button;
- detecting if the mode/color button has been released, and, if the mode/color button has been released, calculating at least one time interval between depression of the mode/color button and release of the mode/color button;
- wherein:
  - if the mode/color button remains depressed for a first time interval of the at least one time interval, emitting light of a first color for a predetermined time then emitting light of a second color for the predetermined time, wherein upon release of the mode/color button, which completes the first actuation of the mode/color button, the lighting device will emit light of the second color, and
  - if the mode/color button has been released after a second time interval of the at least one time interval, which is shorter than the first time interval, emitting light of the first color and a first mode,
- upon a second actuation of the mode/color button, which is defined by a third time interval, changing the first mode of emitted light to a second mode of emitted, wherein a third actuation and release of the mode/color button, which is defined by a fourth time interval, will extinguish the lighting device, thereby defining a remembered color/mode, and wherein the lighting device will emit light of the remembered color/mode when the mode/color button is next depressed, regardless of the time the lighting device was extinguished.

2. The method of claim 1, further comprising actuating the mode/color button, wherein the lighting device emits the remembered color and mode.

3. The method of claim 1, wherein the first color or second color comprises a series of colors, each displayed for a short time period in a cyclic, random, or preset fashion.

4. The method of claim 1, wherein the second, third, and fourth predetermined time periods are substantially equal.

5. The method of claim 1, wherein the first mode is characterized by the lighting device emitting a steady light.

6. The method of claim 1, wherein the second mode is characterized by the lighting device emitting light that blinks or pulses according to a constant interval.

7. The method of claim 1, wherein the second mode is characterized by the lighting device emitting light that blinks or pulses randomly.

8. The method of claim 1, wherein at least one of the first color, second color, first mode, second mode, first time interval, second time interval, third time interval, and fourth time interval are selectively controlled.

9. The method of claim 8, wherein selective control is provided through a computing system not associated with the lighting module.

10. A method for selecting a mode/color on a lighting module, comprising:

- receiving a first actuation of a button;
- responsive to the first actuation, turning a lighting device associated with the lighting module on to display a first mode/color;
- detecting that the button remains actuated;
- displaying with the lighting device a plurality of modes/colors in a timed sequence, such that each mode/color of the plurality of modes/colors is displayed for a preset time period;
- detecting that the button is not actuated;
- displaying a selected mode/color of the plurality of modes/colors that was displayed when the button was not actuated; and
- wherein the selected mode/color is remembered based on the detecting that the button is released when the lighting module is shut off, such that the selected mode/color is activated upon turning the lighting module on, regardless of the time the lighting device was extinguished.

11. The method of claim 10, further comprising receiving a second actuation of the button, and changing a selected mode/color to flashing in response to the second actuation.

12. The method of claim 11, wherein the changing the selected mode/color only occurs if a flashing preset time period has not passed.

13. The method of claim 12, wherein if the flashing preset time period has passed, the second actuation causes the lighting module to shut off.

14. The method of claim 10, wherein one of the modes/colors is a mode characterized by displaying a series of light colors, each for a short time period in a cyclic, random, or preset fashion.

15. A lighting module comprising:

- a light source;
- a button
- a microprocessor configured to execute stored instructions to:
  - emit light of a first color if the button is actuated for a first predetermined time period;

emit light of the first color for a predetermined interval and emit light of a second color for the predetermined interval in a cyclic fashion if the button is actuated for a second predetermined time period that is longer than the first predetermined time period;

maintaining the light emitted from the light source at the first color and a first mode after the first predetermined time period or maintaining the light emitted from the light source at the second color and the first mode after the second predetermined time period;

change the first mode to a second mode if the button is actuated for a third predetermined time period to;

turn the light source off of the button is actuated for a fourth predetermined time period; and wherein a mode/color of light emitted from the light source at an end of the fourth predetermined time period defines a remembered color and/or mode, regardless of the time the lighting source was extinguished.

16. The lighting module of claim 15, wherein the microprocessor is further configured to execute stored instructions to receive a second actuation of the button, and change the mode/color to flashing or pulsing in response to the second actuation.

17. The lighting module of claim 16, wherein changing the mode/color only occurs if a flashing preset time period has not passed.

18. The lighting module of claim 17, wherein one of the mode/color is a mode characterized by displaying a series of light colors, each for a short time period in a cyclic, random, or preset fashion.

* * * * *